Aug. 19, 1958 T. O. LILLQUIST 2,848,262
WHEEL SLIDE CONTROL FOR DYNAMIC BRAKING
Filed July 29, 1952
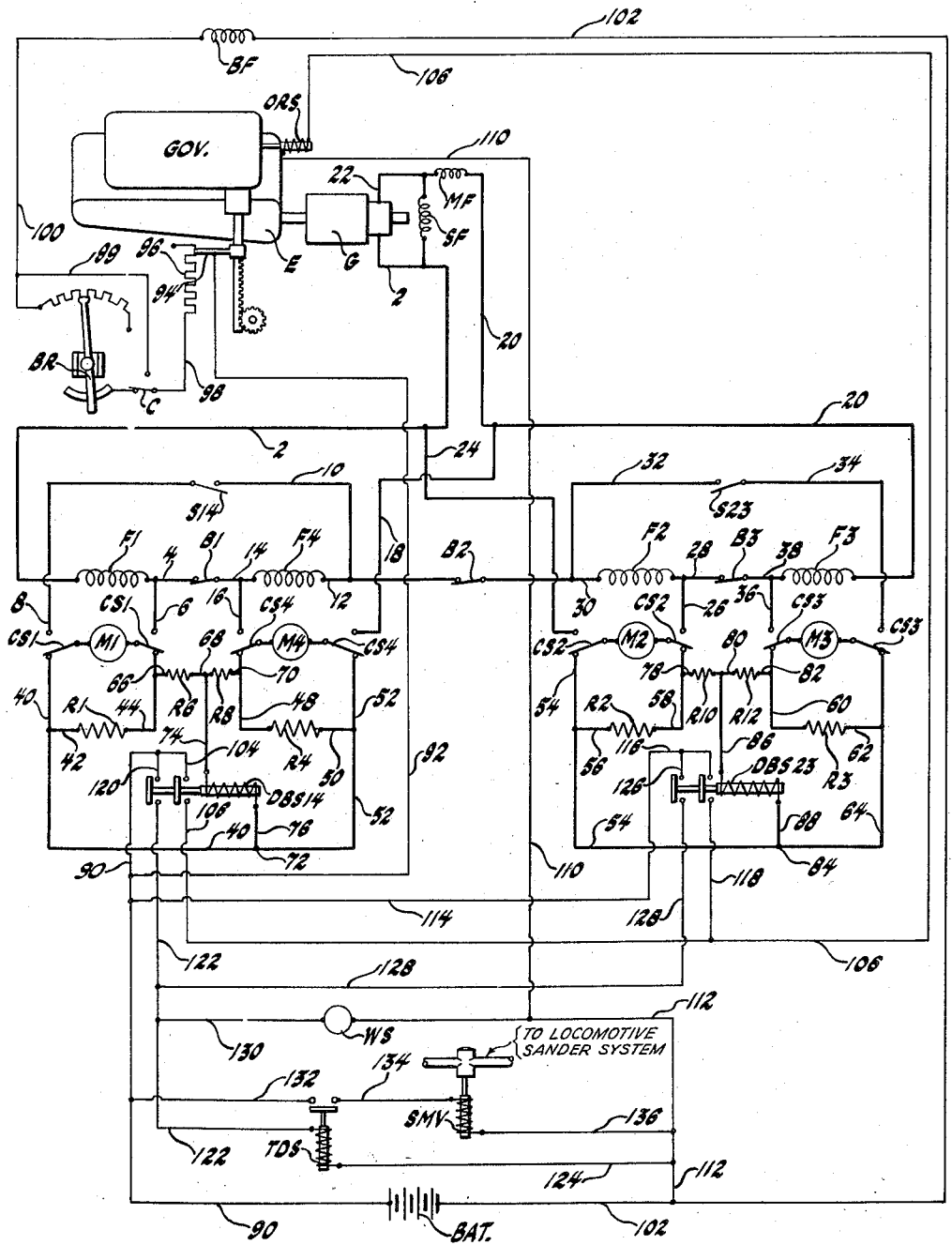
Inventor
Torsten O. Lillquist
By
Willito, Helwig & Caillio
Attorneys

United States Patent Office 2,848,262
Patented Aug. 19, 1958

2,848,262

WHEEL SLIDE CONTROL FOR DYNAMIC BRAKING

Torsten O. Lillquist, La Grange Park, Ill., assignor to General Motors Corporation, Detroit, Mich., a corporation of Delaware Application July 29, 1952, Serial No. 301,427

10 Claims. (Cl. 291—2)

This invention relates generally to dynamic braking systems for diesel electric locomotives and more particularly to wheel slide control means combined with automatic sanding to correct wheel slide occurring on railway vehicles while operating in dynamic braking.

Upon starting or acceleration, the drivers of a locomotive have a tendency to slip because the power applied to the wheels is too great and overcomes the frictional forces acting between the wheels and the rails. A somewhat related difficulty occurs when the locomotive is connected for dynamic braking and too great a load is applied to the traction motors. When this happens the braking effort on the wheels overcomes the adhesive frictional forces acting between the wheels and the rails and causes the wheels to slide along the rails.

The wheel slip which takes place on locomotives operating in power is an old problem and several wheel slip control means have been developed which are being used at the present time.

The problem of wheel slide which occurs during dynamic braking, however, is relatively new and has only recently been accentuated by the increased demand for dynamic braking on locomotives, increased dynamic braking capacities, and the use of dynamic braking at speeds heretofore considered out of range for safe dynamic braking. Some of the disadvantages of this wheel slide during dynamic braking are reduction in the effectiveness of the dynamic braking system and rapid wear on both wheels and rails.

In order to emphasize the basic difference between wheel slip in power and wheel slide in dynamic braking, it should be explained that when wheel slip in power occurs the wheels turn more rapidly than they would if complete adhesion was maintained between wheels and rails. Wheel slide in dynamic braking, however, is just the reverse; the wheels turn more slowly than they would if enough adhesion could be obtained.

It should immediately be appreciated that while both the problem of wheel slip and that of wheel slide are at least partly due to insufficient adhesion between wheels and rails, they are otherwise unrelated. This is further borne out by the fact that while several means have been developed to correct wheel slip in power, no known means have been provided to detect and correct wheel slide occurring during dynamic braking.

It therefore becomes an object of this invention to provide wheel slide control means for railway vehicles utilizing dynamic braking equipment.

It is a further object of this invention to provide wheel slide control means in unique combination with automatic sanding means for railway vehicles equipped with dynamic braking systems.

It is another object of this invention to provide means for automatically reducing the dynamic braking effort of diesel-electric locomotives in order to correct wheel slide on said locomotive during dynamic braking.

The drawing is a schematic diagram of the electrical circuits and equipment for a diesel electric locomotive including the dynamic braking circuits and the new wheel slide control means therefor, with the high voltage circuits being indicated by the heavy lines and the low voltage control circuits being indicated by the thin lines.

Referring now to the schematic diagram a prime mover designated generally by the letter E is shown. The prime mover E turns a direct current generator G which is excited by a shunt field SF, a series field MF and a battery field BF. When the generator G is connected so that the locomotive is operating in power a pair of series switches S14 and S23 are closed, three dynamic braking switches B1, B2 and B3 are open, and cam switch portions CS1—CS1, CS2—CS2, CS3—CS3, CS4—CS4 are all in a position opposite to that shown in the diagram. With these switches so positioned the generator G may supply power to four series type traction motors M1, M2, M3 and M4 normally connected in series parallel therewith and excited by fields F1, F2, F3 and F4 respectively. This power is supplied to traction motors M1 and M4 by means of a conductor 2 connected to the positive side of the generator G, through the field F1 of the traction motor M1, through conductors 4 and 6, contacts of one of the cam switch portions CS1, the armature of traction motor M1, contacts of the other cam switch portion CS1, conductor 8, the normally closed contacts of a series switch S14, conductor 10, conductor 12, the field F4 of the traction motor M4, conductor 14, conductor 16, contacts of one of the cam switch portions CS4, the armature of traction motor M4, contacts of the other cam switch portion CS4, conductor 18, conductor 20, the generator series field MF and a conductor 22 connected to the negative side of the generator G. Power is also supplied to motors M2 and M3 in a similar manner by means of the conductor 2 connected to the positive side of the main generator, a conductor 24, contacts of one of the cam switch portions CS2, the armature of the traction motor M2, contacts of the cam switch portion CS2, conductor 26, conductor 28, the field F2 of traction motor M2, conductor 30, conductor 32, the closed contacts of the series switch S23, conductor 34, contacts of one of the cam switch portions CS3, the armature of traction motor M3, contacts of the other cam switch portion CS3, conductor 36, conductor 38, the field F3 of the traction motor M3, conductor 20, the series field MF of the generator and conductor 22 to the negative side of the generator G.

When it is desired to utilize the locomotive dynamic braking system the series switches S14 and S23 are opened; the cam switch portions CS1—CS1, CS2—CS2, CS3—CS3, CS4—CS4 of the locomotive cam switch are moved to the positions shown in the diagram; and the switches B1, B2 and B3 are closed all in a well-known manner. With the series switches S14 and S23 open and the switches B1, B2 and B3 closed, the traction motor fields F1, F4, F2 and F3 are connected in series across the main generator G so that current may flow therethrough by means of the conductor 2, field coil F1, conductor 4, the now closed contacts of switch B1, conductor 14, field coil F4, conductor 12, the now closed contacts of switch B2, conductor 30, field coil F2, conductor 28, the now closed contacts of switch B3, conductor 38, field coil F3, conductor 20, the series field MF of the main generator G and conductor 22 to the negative side of generator G. Also, with the cam switch portions in the positions shown, the armatures of traction motors M1, M4, M2 and M3 are connected across dynamic brake resistances R1, R4, R2 and R3 respectively. Current may now flow from the armature of traction motor M1 through the dynamic braking grid R1 by means of closed contacts of one cam switch portion CS1, conductor 40, conductor 42, conductor 44, and the closed contacts of the other cam switch portion CS1. Current may also flow from the armature of traction motor M4 through the dynamic braking grid R4 by means of the closed contacts of one cam switch portion C84, conductor 48, conductor 50, conductor 52 and the closed contacts of the other cam switch portion CS4. Similarly current may flow through the dynamic braking grid R2 by means of the closed contacts of the cam switch portions CS2—CS2, and conductors 54, 56 and 58. Current may also flow through the dynamic braking grid R3 by means of the closed contacts of the cam switch portions CS3—CS3 and conductors 60, 62 and 64.

Joining the low voltage sides of the dynamic braking grid circuits of traction motors M1 and M4 and representing a portion of the wheel slide control means is a circuit containing a pair of resistances R6 and R8 and including conductors 66, 68 and 70. A junction point 72 is formed by the conductors 40 and 52 between the high voltage sides of the dynamic braking grid circuits of tractions motors M1 and M4. Between the resistors R6 and R8 and bridging the circuit between the low sides of the dynamic braking grid circuits for traction motors M1 and M4 and junction point 72 on the high voltage sides of said circuits is a circuit including a conductor 74, the coil of a relay DBS14 and a conductor 76.

A similar arrangement for traction motors M2 and M3 is shown which includes a circuit joining the low voltage sides of the dynamic braking grid circuits for said last mentioned traction motors and containing a pair of resistances R10 and R12 and conductors 78, 80 and 82. A similar junction point 84 is formed on the high voltage sides of the dynamic braking grid circuits for motors M2 and M3 by means of conductors 54 and 64. A bridge circuit joins the circuit between the low voltage sides of the dynamic braking circuits and the junction point 84 and comprises the conductor 86, the coil of a relay DBS23 and a conductor 88.

Referring now to the thin lines of the schematic diagram representing the low voltage control circuits, a battery BAT is shown connected to the battery field BF which supplies voltage thereto by means of conductors 90 and 92, an arm 94 actuated by a rack and pinion which is attached to the engine governor GOV, a resistance 96 which is varied by the arm 94 attached to engine governor, conductor 98, the closed contacts of a switch C, the arm of a dynamic braking rheostat BR, the resistance of the braking rheostat BR, a conductor 100, battery field BF, conductor 102, and a return to the negative side of the battery BAT. The switch C is provided to shunt the dynamic brake regulator BR by means of conductor 99 when the locomotive is connected in power.

Two groups of low voltage circuits which are normally disconnected from the battery BAT by means of the interlocks of the relays DBS14 and DBS23 are shown. In the group controlled by relay DBS14 is a circuit including the battery BAT, conductor 90, conductor 104, one interlock of relay DBS14, conductor 106, an overriding solenoid ORS, conductor 110, conductor 112, conductor 102, and a return to the negative side of the battery BAT. Another circuit in the group controlled by relay DBS14 includes battery BAT, conductor 90, conductor 120, the other interlock of relay DBS14, conductor 122, the winding of a time delay switch TDS, conductors 124, 112 and 102 and a return to the negative side of the battery BAT. A wheel slip light WS is connected in parallel with the winding of the time delay relay TDS and across the battery BAT by means of conductors 130 and 112. The time delay switch TDS closes and, by means of a time delay device indicated generally by T after a predetermined interval of time, opens a circuit containing the sanding magnetic valve SMV for applying sand to the rails. The last mentioned circuit includes the battery BAT, conductor 90, a conductor 132, the interlock of the time delay switch TDS, a conductor 134, the sanding magnetic valve SMV, a conductor 136, conductors 112 and 102 and a return to the negative side of the battery BAT.

The circuits controlled by relay DBS23 are similar to those just described, and the first of this second group includes the battery BAT, conductor 90, conductor 114, conductor 116, one set of interlocks of relay DBS23, conductor 118, conductor 106, the overriding solenoid ORS, conductors 110, 112 and 102 and a return to the negative side of the battery BAT. Also includable in the second group which are completed by relay DBS23 is a circuit containing battery BAT, conductors 90 and 114, conductor 126, the other interlocks of relay DBS23 and conductor 128. This last mentioned circuit energizes conductor 122 to operate the time delay switch TDS and the sander magnetic valve SMV as described above in connection with relay DBS14.

The operation of the wheel slide control means is as follows: When the traction motors are connected for dynamic braking as illustrated in the schematic diagram, the braking rheostat BR is placed in a suitable braking effort position. This provides battery field excitation for the generator G and controls the field excitation of the traction motors M1, M4, M2 and M3. This excitation of the traction motors causes the traction motors to generate voltage, and current therefore flows in the dynamic braking circuit of each traction motor. Due to the choice of resistances R6 and R8, the circuit bridging the circuits between the high and low voltage sides of traction motors M1 and M4 and containing the winding of relay DBS14 is normally balanced and no current flows therethrough. If, however, wheel slide takes place in the wheels connected to traction motor M4, for example, then traction motor M4 now turns more slowly and generates less power than traction motor M1. This unbalance of power energizes relay DBS14 by causing current to flow through the winding of relay DBS14. Energizing relay DBS14 closes both sets of its interlocks. Current may now flow from the battery BAT, through conductors 90 and 104, the now closed interlock of relay DBS14, conductors 106, the winding of the overriding solenoid ORS which is thereby energized, and return to battery BAT by means of conductors 110, 112 and 102. When the overriding solenoid is energized it acts upon the engine governor GOV and causes the arm 94 attached to the rack and pinion to place the maximum amount of resistance 96 in series with the battery field BF. This de-excites the generator G and reduces the field excitation of the traction motors M1, M4, M2 and M3. By reducing the excitation of the traction motors their power output is decreased and the load which is being applied to each set of wheels is reduced allowing the sliding wheels to regain proper adhesion with the rails. Upon closure of the interlocks of relay DBS14 current may also flow from battery BAT through conductors 90 and 120, the now closed interlocks of relay DBS14, conductor 122, the winding of time delay switch TDS, and return to the negative side of battery BAT by conductors 124, 112 and 102. This flow of current energizes the time delay switch TDS and causes its interlock to close. Upon closure of the time delay switch interlock the sander magnet valve is energized by current flow from the positive side of battery BAT, through conductors 90, 132, the now closed interlock of the time delay switch TDS, the coil of the sander magnet valve and conductors 136, 112 and 102 to the negative side of the battery. The time delay switch holds the sander valve circuit closed for a predetermined interval of time. This allows sufficient sand to be applied to help the sliding wheels regain proper adhesion with the rails. The wheel slip light is also energized from conductor 22 with a return to the negative side of battery BAT by conductors 112 and 102. This light is placed in the locomotive cab and indicates whenever wheel slide takes place.

If wheel slide takes place in either traction motor M2 or M3 the operaton is the same except that relay DBS23 is energized. This closes the interlocks of relay DBS23 and allows current to flow from the battery BAT to the overriding solenoid ORS by means of conductors 90, 114, 116, the now closed interlocks, and conductors 118 and 106. The time delay switch is also energized by the flow of current from battery BAT through conductors 90, 114, 126, the now closed interlocks, and conductors 128 and 122. The operations of the overriding solenoid ORS, the time delay switch TDS, sander magnet valve SMV, and wheel slip light WS are precisely the same when energized by relay DBS23 as has been described above in connection with relay DBS14.

I claim:

1. In combination with a railway vehicle dynamic braking system including a pair of traction motors having armatures operatively connected to traction wheels and adapted to be turned thereby, a voltage source, a generator, a main field for said generator in electrical circuit with said voltage source, a variable resistor in electrical circuit with said main field and said voltage source, means to turn said generator, fields for exciting said traction motors and in electrical circuit across said generator, resistive loads in electrical circuit across each of said traction motor armatures, wheel slide control means for correcting wheel slide occurring during dynamic braking of said vehicle comprising a bridge circuit electrically connected between low voltage sides of said traction motors and high voltage sides of said traction motors when acting as generators during dynamic braking and containing a solenoid coil energized by any difference of speed between the armatures of said traction motors which causes an unbalance in the voltages generated by said motors and current flow through said bridge circuit and said solenoid coil therein, contact making means operable by said solenoid coil to complete a pair of electrical circuits including said voltage source, one of said electrical circuits containing a relay adapted to vary said variable resistor to add resistance to said main field of said generator and thereby reduce its strength and the field excitation of said traction motors to eliminate differences in speed between said traction motor armatures, the other of said electrical circuits containing a time delay relay adapted to complete a circuit including said voltage source and energizing a third relay for supplying sand to said traction wheels.

2. In combination with a railway vehicle including a pair of traction motors having armatures operatively connected to traction wheels and adapted to be turned thereby, a generator, means to turn said generator, a source of voltage, a main field in electrical circuit with said source of voltage and adapted to excite said generator, fields for exciting said traction motors and in electrical circuit across said generator, resistive loads in electrical circuit across said traction motor armatures, wheel slide control means for eliminating wheel slide occurring during dynamic braking of said vehicle comprising means sensitive to differences of speed between said traction motors when acting as generators during dynamic braking and operatively connected to said main field of said generator to reduce field excitation of said generator and traction motors, and means connected to a sanding system for said vehicle and operable by said wheel slide control means.

3. In combination with a railway vehicle dynamic braking system including a pair of traction motors having armatures operatively connected to traction wheels and adapted to be turned thereby, a voltage source, a generator, a main field for exciting said generator and in electrical circuit with said voltage source, variable resistive means in electrical circuit with said voltage source and said main field to control the strength of said main field, means to turn said generator, fields for exciting said traction motors and in electrical circuit across said generator, resistive loads in electrical circuit across said traction motor armatures, wheel slide control means for eliminating wheel slide occurring during dynamic braking of said vehicle comprising a voltage relay operatively connected between low voltage sides of said traction motors and high voltage sides of said traction motors acting as generators during dynamic braking, said voltage relay adapted to operate said resistive means to reduce the strength of said main field to decrease field excitation of said traction motors and correct differences of speed between said traction motors and said traction wheels.

4. In combination with a railway vehicle including a pair of traction motors having armatures operatively connected to traction wheels and adapted to be turned thereby, a voltage source, a generator, a main field for exciting said generator and in electrical circuit with said voltage source, means to turn said generator, fields for exciting said traction motors and in electrical circuit across said generator, resistive loads in electrical circuit across said traction motor armatures, wheel slide control means for eliminating wheel slide occurring during dynamic braking of said vehicle comprising a voltage relay operatively connected between low voltage sides of said traction motors and the high voltage sides of said traction motors which act as generators during dynamic braking, variable resistive means in electrical circuit with said voltage source and said main field to vary the strength of said main field, said voltage relay adapted to operate said resistive means to reduce the strength of said main field to decrease field excitation of said traction motors and correct differences of speed between said traction motors, and means connected to a sanding system for said vehicle and operable by said voltage relay to supply sand to said wheels.

5. In combination with a railway vehicle including a pair of traction motors having armatures operatively connected to traction wheels and adapted to be turned thereby, a generator, means to turn said generator, a source of voltage, a main field in electrical circuit with said source of voltage and adapted to excite said generator, fields for exciting said traction motors and in electrical circuit across said generator, resistive loads in electrical circuit across said traction motor armatures, wheel slide control means for said vehicle comprising means sensitive to differences of speed between said traction motors to correct differences of speed between said motors and said traction wheels when applying dynamic brake, and means connected to a sander system for said vehicle and operable by said wheel slide control means to provide sand to said wheels.

6. In combination with a railway vehicle dynamic braking system including a pair of traction motors having armatures operatively connected to traction wheels and adapted to be turned thereby, means to excite said traction motors, wheel slide control means for said vehicle comprising means sensitive during dynamic braking of said vehicle to differences of speed between said traction motors to reduce field excitation of said traction motors to correct differences of speed between said motors acting as generators during dynamic braking, and means operable by said wheel slide control means to energize a sander system for said vehicle.

7. In combination with a railway vehicle dynamic braking system including a pair of traction motors having armatures operatively connected to traction wheels and adapted to be turned thereby, a generator, means to turn said generator, a source of voltage, a main field in electrical circuit with said source of voltage and adapted to excite said generator, fields for exciting said traction motors and in electrical circuit across said generator, resistive loads in electrical circuit across said traction motor armatures, means responsive during dynamic braking to differences in the generated voltages of said traction motors acting as generators and operatively connected to said main field of said generator to reduce field excitation of said generator and traction motors to eliminate differences of speed therebetween.

8. In combination with a railway vehicle dynamic braking system including a pair of traction motors having armatures operatively connected to traction wheels and adapted to be turned thereby, a voltage source, a generator, a main field for exciting said generator and in electrical circuit with said voltage source, variable resistive means in electrical circuit with said voltage source and said main field to control the strength of said main field, a dynamic braking regulator having a manually controlled variable resistance in electrical circuit with said voltage source and said main field to vary the field excitation of said generator, means to turn said generator, fields for exciting said traction motors and in electrical circuit across said generator, resistive loads in electrical circuit across said traction motor armatures, wheel slide control means for said vehicle comprising a voltage relay operatively connected between low voltage sides of said traction motors and high voltage sides of said traction motors acting as generators during dynamic braking, said voltage relay adapted to operate said resistive means to reduce the strength of said main field without changing control of said braking regulator to decrease field excitation of said traction motors and eliminate differences of speed between said traction motors during dynamic braking of said vehicle.

9. In combination with a railway vehicle dynamic braking system including a pair of traction motors having armatures operatively connected to traction wheels and adapted to be turned thereby, a voltage source, a generator, a main field for exciting said generator and in electrical circuit with said voltage source, variable resistive means in electrical circuit with said voltage source and said main field to control the strength of said main field, a dynamic braking regulator having a manually controlled variable resistance and in electrical circuit with said voltage source and said main field to vary the field excitation of said generator, means to turn said generator, fields for exciting said traction motors in electrical circuit across said generator, resistive loads in electrical circuit across said traction motor armatures, wheel slide control means for correcting wheel slide occurring during dynamic braking of said vehicle comprising a voltage relay operatively connected between low voltage sides of said traction motors and high voltage sides of said traction motors acting as generators during dynamic braking, said voltage relay adapted to operate said resistive means to reduce the strength of said main field without changing control of said braking regulator to decrease field excitation of said traction motors and correct differences of speed between said traction motors, and means operable by said voltage relay to energize a sander system.

10. In combination with a railway vehicle dynamic braking system including a pair of traction motors having armatures operatively connected to traction wheels and adapted to be turned thereby, a generator, means to turn said generator, a source of voltage, a main field in electrical circuit with said source of voltage and adapted to excite said generator, fields for exciting said traction motors and in electrical circuit across said generator, resistive loads in electrical circuit across said traction motor armatures, wheel slide control means for eliminating wheel slide occurring during dynamic braking of said vehicle comprising an electrically balanced circuit connected between low voltage sides of said traction motors and high voltage sides of said traction motors acting as generators during dynamic braking and including means operatively connected to said main field of said generator to reduce field excitation of said field generator and said traction motors when said electrically balanced circuit becomes unbalanced due to differences of speed in said traction motors, and the means operable by means in said balanced circuit to energize a sanding system for said vehicle.

References Cited in the file of this patent

UNITED STATES PATENTS

| | | |
|---|---|---|
| 1,121,988 | Doyle et al. | Dec. 22, 1914 |
| 2,250,673 | Kew | July 29, 1941 |
| 2,591,791 | Dilworth | Apr. 8, 1952 |